United States Patent
Takeda et al.

(10) Patent No.: US 9,522,702 B2
(45) Date of Patent: Dec. 20, 2016

(54) VEHICLE REAR STRUCTURE

(71) Applicant: SUZUKI MOTOR CORPORATION, Hamamatsu (JP)

(72) Inventors: Munenobu Takeda, Hamamatsu (JP); Daisuke Shindo, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 14/857,674

(22) Filed: Sep. 17, 2015

(65) Prior Publication Data

US 2016/0090128 A1 Mar. 31, 2016

(30) Foreign Application Priority Data

Sep. 26, 2014 (JP) .................. 2014-195974

(51) Int. Cl.
*B60N 99/00* (2006.01)
*B62D 25/08* (2006.01)

(52) U.S. Cl.
CPC .................. *B62D 25/087* (2013.01)

(58) Field of Classification Search
CPC .................................................. B62D 25/087
See application file for complete search history.

(56) References Cited

U.S. PATENT DOCUMENTS 8,919,865 B2 * 12/2014 Ogawa .................. B62D 25/08
296/187.11

FOREIGN PATENT DOCUMENTS

| JP | 2002052982 | 2/2002 | |
| JP | EP 1990262 A1 * | 11/2008 | ........... B62D 25/087 |
| JP | WO 2013069268 A1 * | 5/2013 | ............. B62D 21/11 |

* cited by examiner

*Primary Examiner* — Lori L Lyjak
(74) *Attorney, Agent, or Firm* — Silicon Valley Patent Group LLP

(57) ABSTRACT

A vehicle rear structure located between a backrest and a luggage space includes a first cross member and fixation members. Each fixation member has a joint portion, a first plate and a second plate. The length of a first path extending from a first intersection point of a line passing through a fixation portion at which the second plate is fixed to the vehicle body and an upper side of the second plate through an upper side of the first plate up to the joint portion is as long as a second path extending from a second intersection point of the line and a lower side of the second plate through a lower side of the first plate up to the joint portion.

8 Claims, 4 Drawing Sheets

VEHICLE REAR STRUCTURE

CROSS-REFERENCE TO RELATED APPLICATIONS

This application is based upon and claims the benefit of priority from the prior Japanese Patent Application No. 2014-195974, filed on Sep. 26, 2014, the entire contents of which are incorporated herein by reference.

FIELD

The present invention relates to a vehicle rear structure located between a backrest of a rear seat and a luggage space on the rear side of the backrest.

BACKGROUND

In a vehicle such as an automobile, a luggage space is located on the rear side of a backrest of a rear seat, for example. In such a vehicle, there is a possibility that a piece of luggage in the luggage space moves to the vehicle front side at the time of a rear end collision and comes into contact with the backrest, and a large load is applied to the backrest.

JP 2002-52982 describes a vehicle rear structure in which a safety block extending in the vehicle-width direction is arranged between a backrest of a rear seat and a luggage space on the rear side of the backrest. The safety block is provided with a projecting portion that projects upward and extends over the vehicle-width direction, and a side end that is bent downward from an end of the projecting portion in the vehicle front-rear direction.

In JP 2002-52982, a closed section constituted by the safety block and a rear floor panel is formed by coupling a lower part of the side end of the safety block to an upper face of the rear floor panel that forms a vehicle floor, using a bolt or the like. Note that an auxiliary reinforcement material which projects downward is installed at a position overlapped by the safety block as viewed in the vehicle vertical direction, on a lower face of the rear floor panel.

JP 2002-52982 states that even if a piece of luggage moves to the vehicle front side at the time of a rear end collision or the like, the luggage is prevented from entering a passenger compartment by the projecting portion of the safety block.

In the structure described in JP 2002-52982, a situation may possibly occur in which, at the time of a rear end collision or the like, a piece of luggage gets over the projecting portion of the safety block and enters the passenger compartment, depending on the size of the piece of luggage. For this reason, as an example, a structure is conceivable in which a cross member is spanned in the vehicle-width direction on the vehicle rear side of the backrest and above the rear floor panel. Here, the cross member is arranged while inclining obliquely upward on the rear side so as to face the backrest.

However, with this structure, it is necessary, in order to withstand an impact load applied from the luggage, to attach the cross member to a vehicle body via a large bracket that is provided in the vehicle body and extends in the vehicle vertical direction. Consequently, this structure requires the large bracket, and a problem arises in that the weight and costs of the vehicle body increase.

Note that configurations are also conceivable in which members such as pipes spanned in the vehicle-width direction are attached to the vehicle body in a crossing manner on the rear side of the backrest, and in which the strength of the backrest itself is increased. However, both configurations increase the weight and costs of the vehicle body.

A configuration is also conceivable in which the cross member is directly joined to the vehicle body while not using a bracket. However, in this case, if the piece of luggage in the luggage space moves to the vehicle front side at the time of a rear end collision or the like, the piece of luggage first comes into contact with an upper edge of the cross member that inclines obliquely upward on the rear side. Then, there is a possibility that the load concentrates on the upper edge of the cross member, welding is peeled off in an upper part of a joint portion of the cross member and the vehicle body, and the cross member withdraws.

In view of the foregoing problems, an object of the present invention is to provide a vehicle rear structure capable of preventing a cross member arranged on the vehicle rear side of a backrest from withdrawing at the time of a rear end collision.

SUMMARY OF THE DISCLOSURE

To solve the foregoing problems, a feature of a representative configuration of a vehicle rear structure according to the present invention lies in a vehicle rear structure located between a backrest of a rear seat and a luggage space on a rear side of the backrest, including: a first cross member that is spanned in a vehicle-width direction and inclines obliquely upward on a rear side; and fixation members respectively joined to each of both ends of the first cross member and fixed to a vehicle body. Each fixation member has: a joint portion that overlaps an end of the first cross member and is joined thereto; a first plate that bends from an outer end of the joint portion in the vehicle-width direction and extends rearward; and a second plate that bends from a rear end of the first plate, extends outward in the vehicle-width direction, and is fixed to the vehicle body. The second plate is not parallel with the first cross member, and a length of a first path extending from a first intersection point of a line that passes in a vehicle vertical direction through a fixation portion at which the second plate is fixed to the vehicle body and an upper side of the second plate through an upper side of the first plate up to the joint portion is at least as long as a second path extending from a second intersection point of the line and a lower side of the second plate through a lower side of the first plate up to the joint portion.

Here, if a piece of luggage in the luggage space moves to the vehicle front side at the time of a rear end collision of the vehicle, the piece of luggage first comes into contact with the upper edge of the first cross member that inclines obliquely upward on the rear side. Accordingly, the load concentrates on the upper edge of the first cross member, and the load is input to the joint portion of the fixation member. In the above configuration, in the fixation member, the length of the first path extending from the first intersection point on the upper side of the second plate up to the joint portion is longer than or equal to the length of the second path extending from the second intersection point on the lower side of the second plate up to the joint portion. For this reason, if the load is input to the joint portion and the fixation member undergoes deformation, the extension length of an upper part of the fixation member is greater than or equal to the extension length of a lower part thereof. Accordingly, with the above configuration, impact can be absorbed while dispersing the load input to the joint portion not only to the upper part but also to the lower part of the joint portion, and it is therefore possible to prevent the joint portion of the first cross member and the fixation member from withdrawing.

A plate thickness of the fixation member may be thicker than a plate thickness of the first cross member. With this configuration, since the plate thickness of only the fixation member joined to the end of the first cross member is thick, the weight of the first cross member can be reduced.

The fixation portion may include a plurality of fixing points arranged in a vertical direction, and an upper fixing point may be located outward, in the vehicle-width direction, of a lower fixing point. With this configuration, the length of the first path in the upper part of the fixation member is longer than the length of the second path in the lower part. Accordingly, the shapes of the first plate and the second plate can be easily changed, and the first cross member can be easily arranged in an inclined manner so as to face the backrest.

The above vehicle rear end structure may further include: two vertical members to which the fixation members are fixed at the respective fixation portion; and a second cross member that is joined to a lower side of a rear floor panel forming a vehicle floor and extends in the vehicle-width direction. The first cross member may form a frame shape together with the two vertical members and the second cross member. With this configuration, the load of the luggage placed in the luggage space can be sufficiently supported by the frame shape formed by the first cross member, the two vertical members, and the second cross member.

According to the present invention, a vehicle rear structure can be provided that is capable of preventing a cross member arranged on the vehicle rear side of a backrest from withdrawing at the time of a rear end collision.

DETAILED DESCRIPTION

Figure 1A:
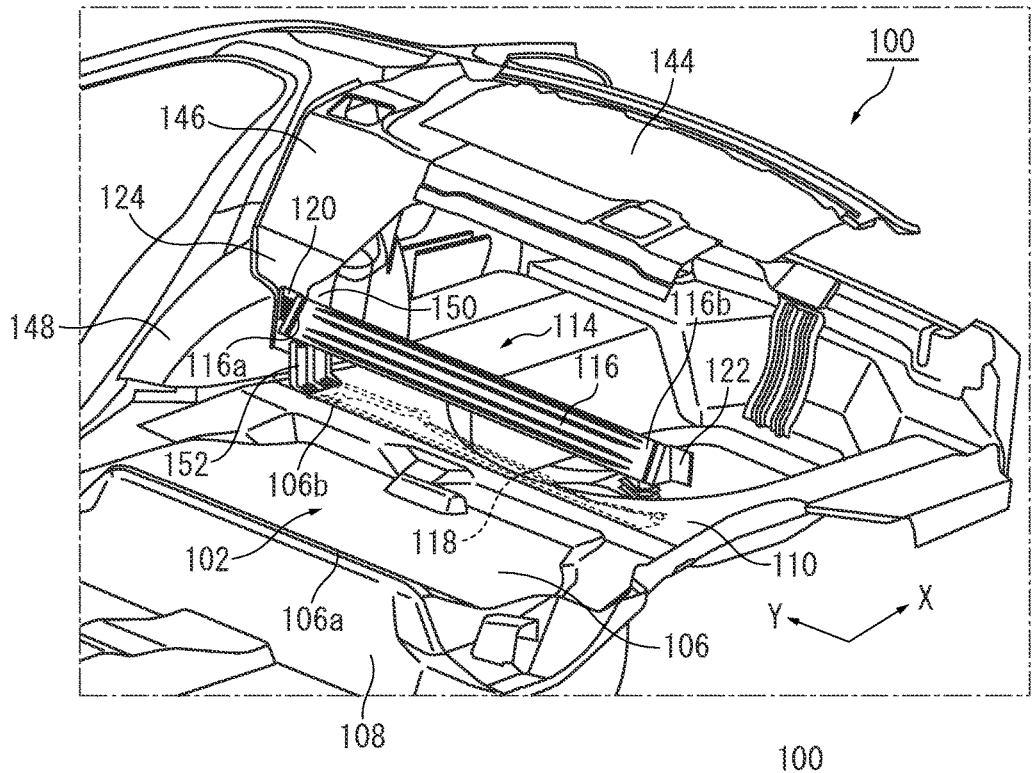
FIGS. 1A and 1B show a vehicle rear structure according to the present embodiment.

A preferable embodiment of the present invention will be hereinafter described in detail with reference to the attached drawings. The dimensions, materials, other specific values, and the like described in the embodiment are mere examples for facilitating understanding of the invention, and do not limit the present invention unless otherwise stated. Note that in the present specification and drawings, elements having substantially the same functions and configurations will be assigned the same reference numerals to omit redundant descriptions, and elements that are not directly related to the present invention will be omitted in the drawings.

Figure 1B:
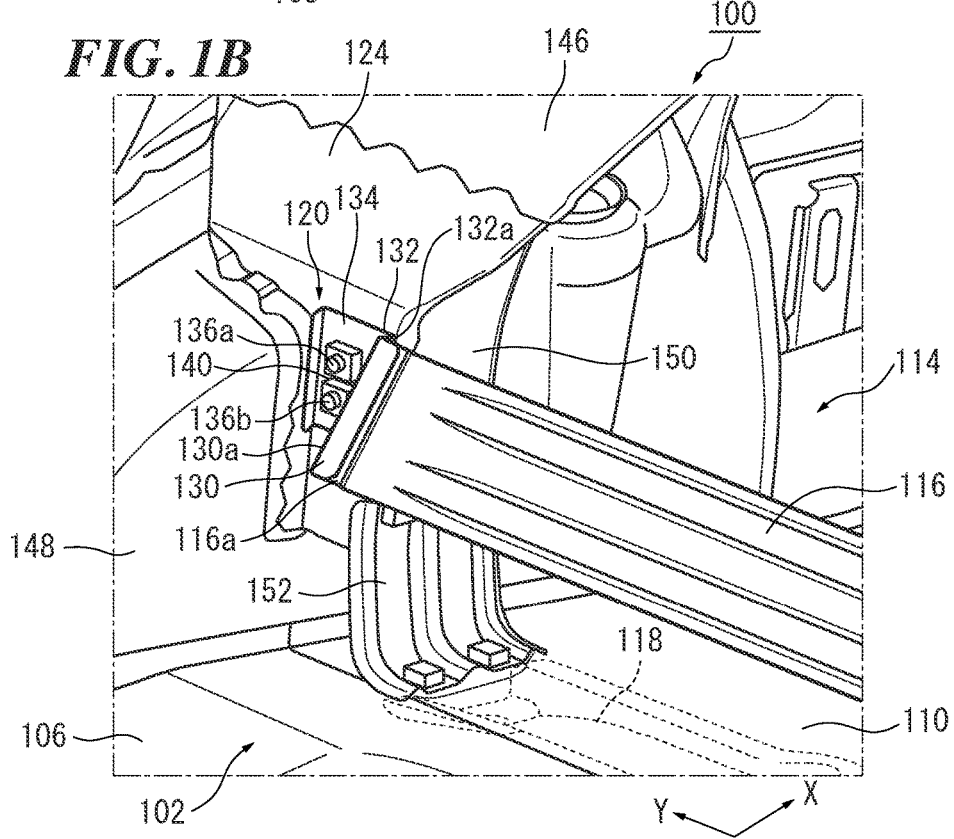
Figure 2:
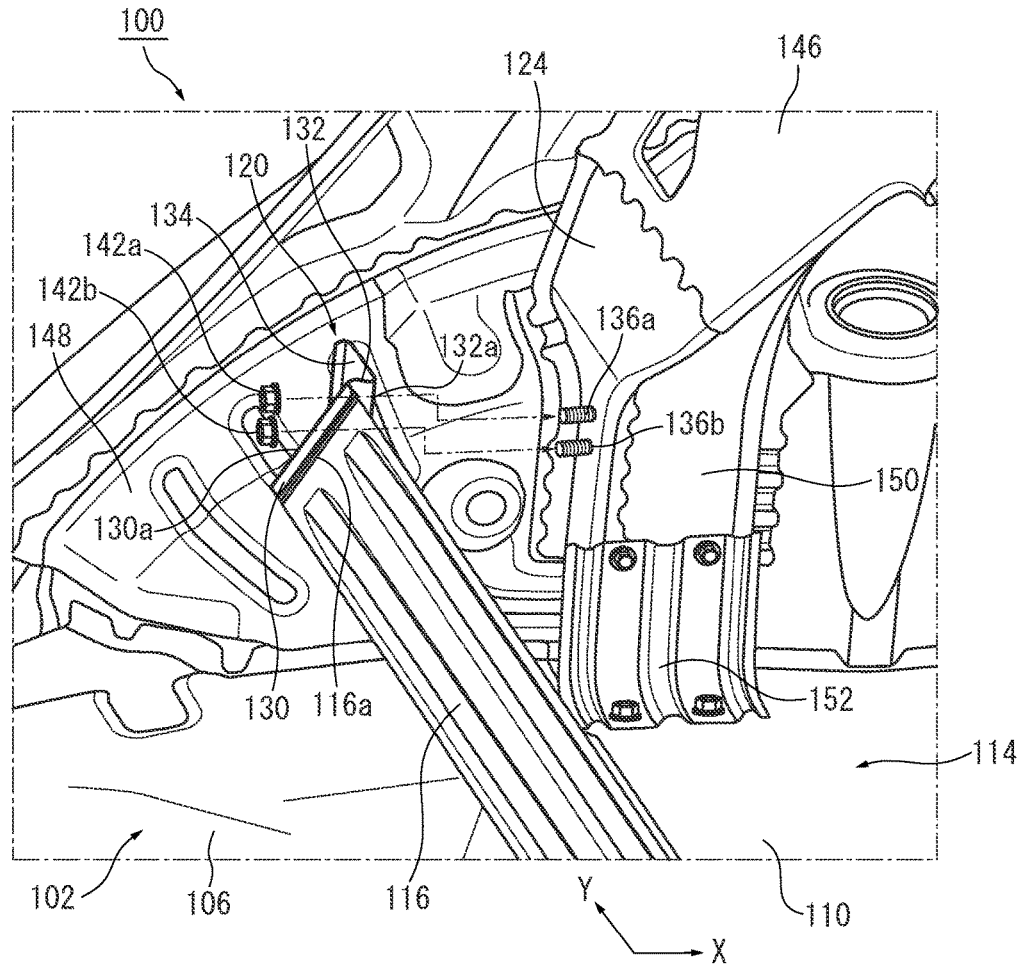
FIG. 2 is an exploded perspective view of the vehicle rear structure in FIG. 1B.

FIGS. 1A and 1B are a diagram showing a vehicle rear structure according to the present embodiment. FIG. 1A shows a vehicle rear as viewed obliquely from the front side, while omitting a rear seat of the vehicle. FIG. 1B shows an enlargement of a part of the vehicle rear structure in FIG. 1A. FIG. 2 is an exploded perspective view of the vehicle rear structure in FIG. 1B. Hereinafter, arrows X and Y shown in the diagrams indicate the vehicle rear side and the outside in the vehicle-width direction, respectively.

As shown in FIG. 1A, a vehicle rear structure 100 is provided with a rear floor panel 102, which forms a vehicle floor in a vehicle rear part. The rear floor panel 102 has a rear floor center panel 106 on which a rear seat (not shown) including a backrest 104 (see FIG. 3B) is placed, a rear floor front panel 108, and a rear floor rear panel 110. The rear floor front panel 108 bends from a vehicle front side end 106a of the rear floor center panel 106 and extends to the vehicle lower side. The rear floor rear panel 110 is continuous, on the rear side, with a vehicle rear side end 106b of the rear floor center panel 106, and is located in a luggage space 114 in which a piece of luggage 112 (FIG. 3B) is placed.

In the present embodiment, a structure located between the backrest 104 and the luggage space 114 on the rear side of the backrest 104 will be mainly described as the vehicle rear structure 100. As shown in FIG. 1A, the vehicle rear structure 100 is provided with a first cross member 116, a second cross member 118, and fixation members 120 and 122. The first cross member 116 is located on the vehicle rear side of the backrest 104, and is spanned in the vehicle-width direction above the rear floor rear panel 110 of the rear floor panel 102. As shown in FIG. 1B, the first cross member 116 inclines obliquely upward on the rear side, and faces the backrest 104 (see FIG. 3B). The second cross member 118 is joined to the lower side of the rear floor rear panel 110 and extends in the vehicle-width direction.

The fixation members 120 and 122 are joined respectively to ends 116a and 116b of the first cross member 116 and fixed to the vehicle body (vertical member 124). The plate thicknesses of the fixation members 120 and 122 are thicker than the plate thickness of the first cross member 116. Note that FIG. 1A omits a vertical member fixed to the fixation member 122 located on the vehicle left side. As shown in FIG. 1A, the first cross member 116 forms a frame shape together with the fixation members 120 and 122, the vertical member 124, and the second cross member 118, and can sufficiently support the load of the piece of luggage 112 placed in the luggage space 114. Although the fixation member 120 and the vertical member 124 located on the vehicle right side will be described below, the fixation member 122 and the vertical member located on the vehicle left side also have similar configurations and functions.

As shown in FIG. 1B, the fixation member 120 has a joint portion 130, a first plate 132, and a second plate 134. The joint portion 130 overlaps the end 116a of the first cross member 116 and is joined thereto. As shown in FIG. 2, the first plate 132 bends from an end 130a of the joint portion 130 on the outside in the vehicle-width direction and extends rearward. The second plate 134 bends from a rear end 132a of the first plate 132 and extends outward in the vehicle-width direction.

As shown in FIG. 1B, the second plate 134 is fixed to the vertical member 124 at a fixation portion 140 at which bolts 136a and 136b and the like are located. At the fixation portion 140, as shown in FIG. 2, nuts 142a and 142b are screwed with the bolts 136a and 136b that are passed through the vertical member 124 and project to the vehicle front side, with the second plate 134 sandwiched between the bolts 136a and 136b and the nuts 142a and 142b, and the second plate 134 is thereby fixed to the vertical member 124.

The vertical member 124 is one of the members supporting a partition panel 144 (see FIG. 1A), and is a partition side front lower panel, for example. The partition panel 144 is arranged roughly parallel with the rear floor rear panel 110 on the vehicle rear side of the backrest 104, and partitions the luggage space 114. The partition panel 144 is supported by a partition side panel 146 as well as the vertical member 124. The partition side panel 146 is arranged roughly parallel with the backrest 104, joined to the partition panel 144 at the upper end, and joined to a wheel housing inner panel 148 at the lower end on the vehicle front side. Note that the wheel housing inner panel 148 is a panel that forms a wheel housing for housing a rear wheel.

The vertical member 124 is joined to the partition side panel 146 and the wheel housing inner panel 148, and is located below the partition side panel 146 on the vehicle inside with respect to the wheel housing inner panel 148. Note that a rear pillar inner front reinforcement 150 is joined to the partition side panel 146 and the vertical member 124 on the vehicle inside. The rear pillar inner front reinforcement 150 is connected to the rear floor rear panel 110 by a wheel housing inner lower gazette 152.

Figure 3A:
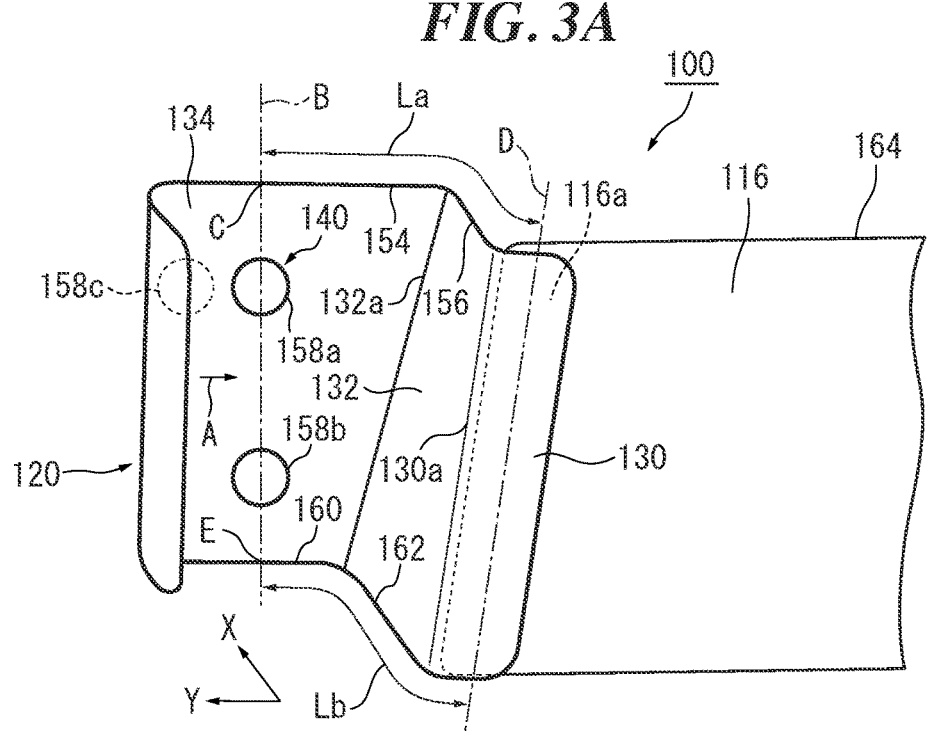
FIGS. 3A and 3B schematically show a part of the vehicle rear structure in FIG. 2.
Figure 3B:
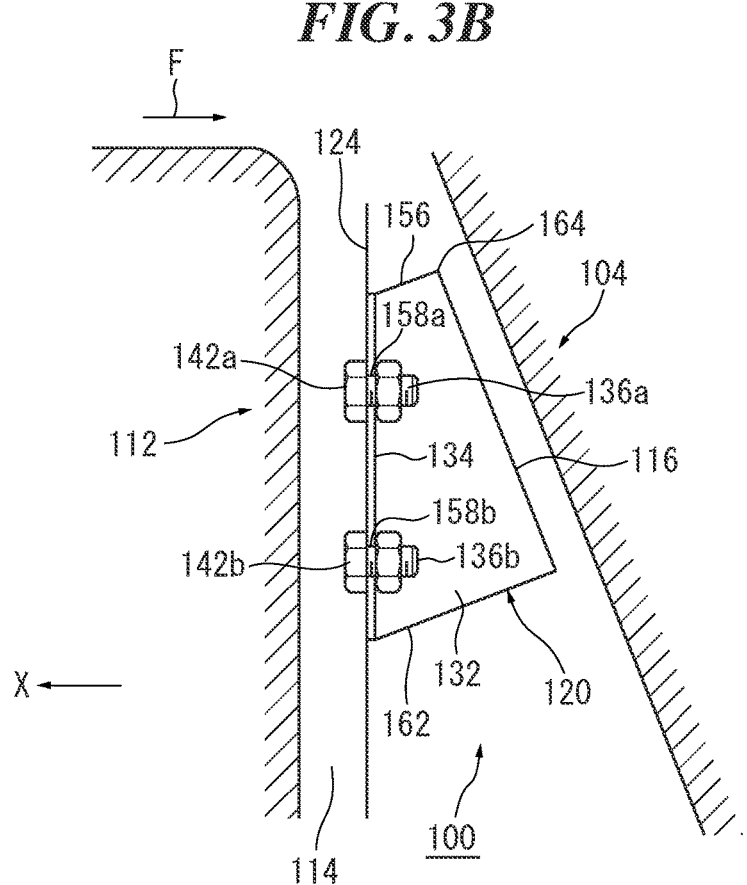

FIGS. 3A and 3B schematically show a part of the vehicle rear structure 100 in FIG. 2. FIG. 3A shows the shape of the fixation member 120 joined to the first cross member 116. FIG. 3B shows a state where the fixation member 120 in FIG. 3A is fixed to the vertical member 124 as viewed from the direction of arrow A in FIG. 3A. Note that FIG. 3B shows the piece of luggage 112 placed in the luggage space 114 and the backrest 104 that faces the first cross member 116, in addition to the vehicle rear structure 100.

In the present embodiment, a first path La is a path extending from a first intersection point C of a line B denoted by a chain line in FIG. 3A and an upper side 154 of the second plate 134 through the upper side 154 of the second plate 134 and an upper side 156 of the first plate 132 up to the joint portion 130. Meanwhile, a second path Lb is a path extending from a second intersection point E of the line B and a lower side 160 of the second plate 134 through the lower side 160 of the second plate 134 and a lower side 162 of the first plate 132 up to the joint portion 130. However, the first path and the second path may also be up to the outer end 130a, in the vehicle-width direction, of the joint portion 130, and not reach the line D. Note that the line B is a line passing through the fixation portion 140 at which the second plate 134 is fixed to the vertical member 124, and is parallel with the vehicle vertical direction. The fixation portion 140 here includes hole portions 158a and 158b, which serve as two fixing points arranged in the vertical direction. As shown in FIG. 3B, the bolts 136a and 136b are passed through these hole portions 158a and 158b. The second plate 134 is fixed to the vertical member 124 by screwing the nuts 142a and 142b with the bolts 136a and 136b.

An important feature of the present embodiment lies in that the length of the first path La is equal to the length of the second path Lb. Here, if the piece of luggage 112 in the luggage space 114 moves to the vehicle front side as indicated by arrow F in FIG. 3B at the time of a rear end collision of the vehicle, the piece of luggage 112 first comes into contact with an upper edge 164 of the first cross member 116 that inclines obliquely upward on the rear side.

For this reason, the load concentrates on the upper edge 164 of the first cross member 116, the load is input to the joint portion 130 of the fixation member 120, and therefore the fixation member 120 undergoes deformation. That is to say, the first path La and the second path Lb of the fixation member 120 receive the load and extend. However, since the length of the first path La is equal to the length of the second path Lb as mentioned above, the extension length of the upper part of the fixation member 120 in the case of deformation is roughly equal to the extension length of the lower part.

Figure 4A:
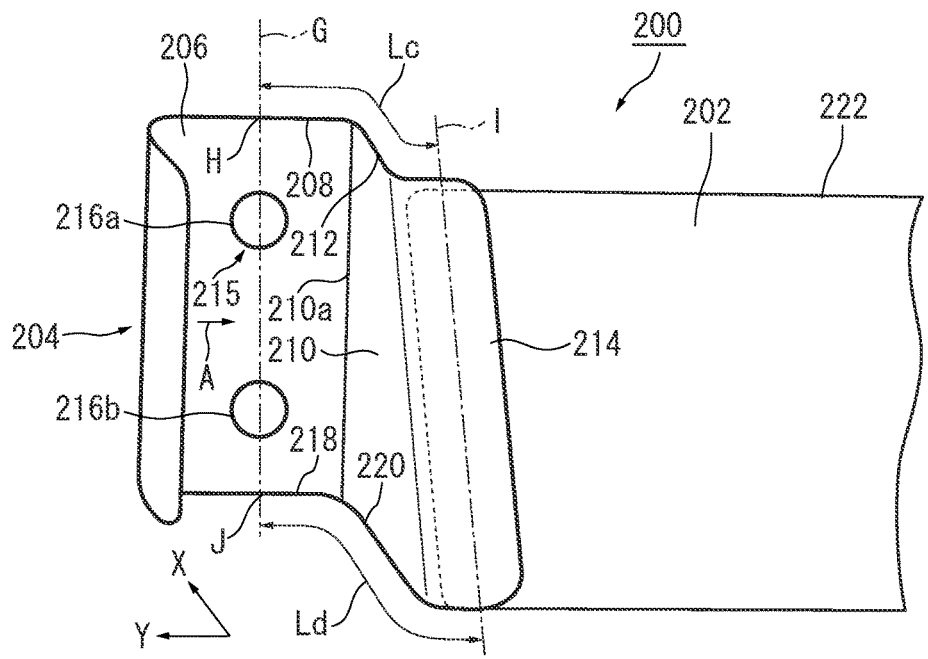
FIGS. 4A and 4B show a vehicle rear structure in a comparative example.
Figure 4B:
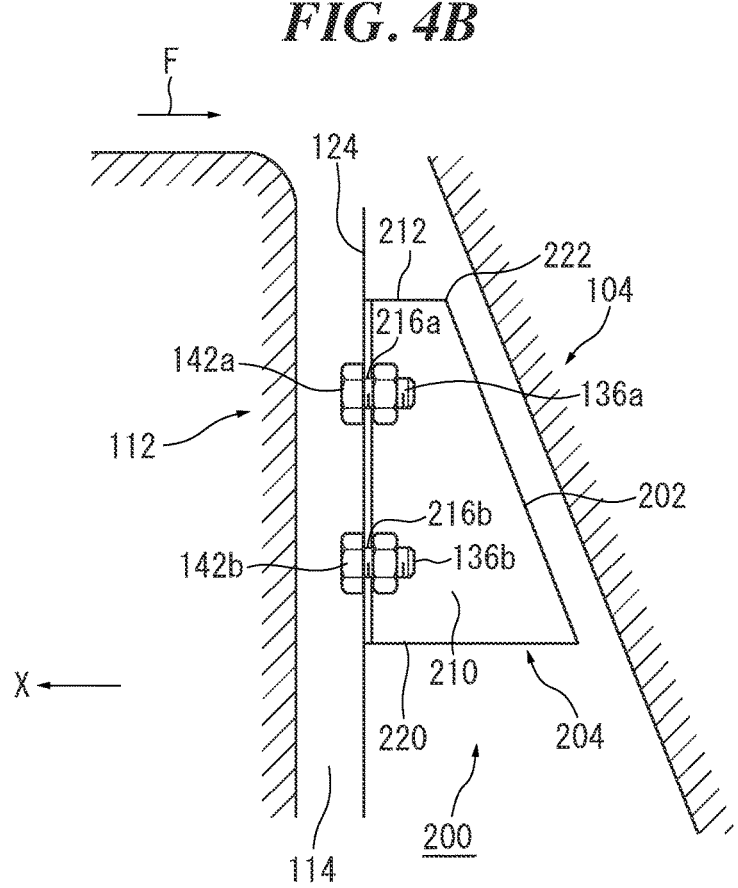

FIGS. 4A and 4B show a vehicle rear structure 200 in a comparative example. FIG. 4A shows the shape of a fixation member 204 in the comparative example joined to a first cross member 202. FIG. 4B shows a state where the fixation member 204 in FIG. 4A is fixed to the vertical member 124 as viewed from the direction of arrow A in FIG. 4A.

The vehicle rear structure 200 in the comparative example is different from the above-described vehicle rear structure 100 in that the length of a first path Lc is shorter than the length of a second path Ld, as shown in FIG. 4A. The first path Lc is a path extending from a first intersection point H of a line G denoted by a chain line in FIG. 4A and an upper side 208 of a second plate 206 through the upper side 208 of the second plate 206 and an upper side 212 of the first plate 210 up to a line I located at a joint portion 214. The line G is a line passing through a fixation portion 215 at which the second plate 206 is fixed to the vertical member 124, and is parallel with the vehicle vertical direction. Note that the fixation portion 215 includes hole portions 216a and 216b, which serve as two fixing points arranged in the vehicle vertical direction.

The second path Ld is a path extending from a second intersection point J of the line G and a lower side 218 of the second plate 206 through the lower side 218 of the second plate 206 and a lower side 220 of the first plate 210 up to the line I indicated at the joint portion 214.

In the fixation member 204 in the comparative example, the length of the upper side 208 of the second plate 206 from the first intersection point H up to a rear end 210a of the first plate 210 is the same as the length of the lower side 218 from the second intersection point J up to the rear end 210a of the first plate 210, and a rectangle is formed as shown in FIG. 4A. In contrast, in the fixation member 120 in the present embodiment, the upper side 154 of the second plate 134 is longer than the lower side 160, and a reverse trapezoid is formed as shown in FIG. 3A. Note that, in both the fixation members 120 and 204, the shape of the first plates 132 and 210 is a trapezoid.

With the vehicle rear structure 200 in the comparative example, when the piece of luggage 112 moves to the vehicle front side at the time of a rear end collision and the load concentrates on an upper edge 222 of the first cross member 202, the fixation member 204 undergoes deformation. However, in the fixation member 204, since the length of the first path Lc is shorter than the length of the second path Ld, the extension length of the upper part of the fixation member 204 at the time of deformation is smaller than the extension length of the lower part.

For this reason, in the vehicle rear structure 200 in the comparative example, the upper part of the fixation member 204 fully extends earlier than the lower part thereof at the time of a rear end collision, an input load concentrates only on the upper part of the joint portion 214 and cannot be dispersed over the entire joint portion 214, and the joint portion 214 is likely to come off.

In contrast, in the present embodiment, the fixation member 120 has a shape in which the first plate 132 forming a trapezoid is adjacent to the second plate 134 forming a reverse trapezoid, and with this shape, the length of the first path La is equal to the length of the second path Lb. That is to say, in the fixation member 120, the extension lengths of the upper part and the lower part in the case of deformation at the time of a rear end collision are equal to each other.

Accordingly, with the vehicle rear structure 100, an input load can be evenly dispersed over the entire joint portion 130 including not only the upper part but also the lower part of the fixation member 120 at the time of a rear end collision, and the joint portion 130 can be prevented from coming off.

In addition, since the plate thicknesses of the fixation members 120 and 122 joined to the ends 116a and 116b of the first cross member 116 are thicker than the plate thickness of the first cross member 116, the weight of the first cross member 116 can be reduced. Furthermore, since the second plate 134 is not parallel with the first cross member 116 as shown in FIG. 3B, the first cross member 116 can be arranged so as to incline obliquely upward on the rear side and face the backrest 104.

In the above embodiment, the length of the first path La of the fixation member 120 is equal to the length of the second path Lb. However, the present invention is not limited thereto, and the length of the first path La may be longer than the length of the second path Lb. As an example, as shown in FIG. 3A, a hole portion 158c may be provided, which serves as an upper fixing point located outward, in the vehicle-width direction, of the hole portion 158b serving as the lower fixing point, in place of the hole portion 158a serving as the upper fixing point included in the fixation portion 140.

With this configuration, when a load is input to the joint portion 130 and the fixation member 120 undergoes deformation, the extension length of the upper part of the fixation member 120 is longer than the extension length of the lower part. Accordingly, the load input to the joint portion 130 is more dispersed, enabling the impact to be easily observed, and the joint portion 130 of the first cross member 116 and the fixation member 120 is more unlikely to come off. In addition, since the length of the first path La of the fixation member 120 is longer than the length of the second path Lb, the degree of freedom of the shape of the first plate 132 and the second plate 134 increases, and the first cross member 116 can be more easily arranged so as to face the backrest 104.

Although a preferable embodiment of the present invention has been described above with reference to the attached drawings, the present invention is needless to say not limited to the above-described example. It is apparent that a person skilled in the art may conceive various variations and modifications within the scope of the appended patent claims, and those variations and modifications should be understood to be naturally encompassed in the technical scope of the present invention.

The present invention can be used in a vehicle rear structure located between a backrest of a rear seat and a luggage space on the rear side of the backrest.

The invention claimed is:

1. A vehicle rear structure located between a backrest of a rear seat and a luggage space on a rear side of the backrest, the vehicle rear structure comprising:
   a first cross member that is spanned in a vehicle-width direction and inclines obliquely upward on a rear side; and
   fixation members respectively joined to each of both ends of the first cross member and fixed to a vehicle body;
   wherein each fixation member has:
      a joint portion that overlaps an end of the first cross member and is joined thereto;
      a first plate that bends from an outer end of the joint portion in the vehicle-width direction and extends rearward; and
      a second plate that bends from a rear end of the first plate, extends outward in the vehicle-width direction, and is fixed to the vehicle body;
   wherein the second plate is not parallel with the first cross member; and
   wherein a length of a first path extending from a first intersection point of a line that passes in a vehicle vertical direction through a fixation portion at which the second plate is fixed to the vehicle body and an upper side of the second plate through an upper side of the first plate up to the joint portion is at least as long as a second path extending from a second intersection point of the line and a lower side of the second plate through a lower side of the first plate up to the joint portion.

2. The vehicle rear structure according to claim 1, wherein a plate thickness of the fixation member is thicker than a plate thickness of the first cross member.

3. The vehicle rear structure according to claim 1, wherein the fixation portion includes a plurality of fixing points arranged in a vertical direction, and an upper fixing point is located outward, in the vehicle-width direction, of a lower fixing point.

4. The vehicle rear structure according to claim 2, wherein the fixation portion includes a plurality of fixing points arranged in a vertical direction, and an upper fixing point is located outward, in the vehicle-width direction, of a lower fixing point.

5. The vehicle rear structure according to claim 1, further comprising:
   two vertical members to which the fixation members are fixed at the fixation portion; and
   a second cross member that is joined to a lower side of a rear floor panel forming a vehicle floor and extends in the vehicle-width direction;
   wherein the first cross member forms a frame shape together with the two vertical members and the second cross member.

6. The vehicle rear structure according to claim 2, further comprising:
   two vertical members to which the fixation members are fixed at the fixation portion; and
   a second cross member that is joined to a lower side of a rear floor panel forming a vehicle floor and extends in the vehicle-width direction;
   wherein the first cross member forms a frame shape together with the two vertical members and the second cross member.

7. The vehicle rear structure according to claim 3, further comprising:
   two vertical members to which the fixation members are fixed at the fixation portion; and
   a second cross member that is joined to a lower side of a rear floor panel forming a vehicle floor and extends in the vehicle-width direction;
   wherein the first cross member forms a frame shape together with the two vertical members and the second cross member.

8. The vehicle rear structure according to claim 4, further comprising:
   two vertical members to which the fixation members are fixed at the fixation portion; and
   a second cross member that is joined to a lower side of a rear floor panel forming a vehicle floor and extends in the vehicle-width direction;
   wherein the first cross member forms a frame shape together with the two vertical members and the second cross member.

* * * * *